(12) United States Patent
Chou et al.

(10) Patent No.: US 7,296,096 B2
(45) Date of Patent: *Nov. 13, 2007

(54) METHOD AND SYSTEM FOR CONFIGURING AN INTERCONNECT DEVICE

(75) Inventors: Norman C. Chou, San Jose, CA (US);
Prasad Vajihala, San Jose, CA (US);
Richard Schober, Cupertino, CA (US);
Laura Randall, Ft. Collins, CO (US);
Ian G. Collof, Los Gatos, CA (US)

(73) Assignee: Palau Acquisition Corporation (Delaware), Santa Clara, CA (US)

( * ) Notice: Subject to any disclaimer, the term of this patent is extended or adjusted under 35 U.S.C. 154(b) by 154 days.

This patent is subject to a terminal disclaimer.

(21) Appl. No.: 11/173,167

(22) Filed: Jul. 1, 2005

(65) Prior Publication Data
US 2006/0006905 A1    Jan. 12, 2006

Related U.S. Application Data

(62) Division of application No. 09/948,924, filed on Sep. 7, 2001, now Pat. No. 7,043,569.

(51) Int. Cl.
*G06F 3/00* (2006.01)

(52) U.S. Cl. ............................................. 710/8; 710/10

(58) Field of Classification Search ................ 710/8, 710/9, 11, 36, 39, 62, 64, 316–317; 711/170; 370/388, 400; 709/220, 221, 239
See application file for complete search history.

(56) References Cited

U.S. PATENT DOCUMENTS

| | | | | |
|---|---|---|---|---|
| 5,867,714 A | * | 2/1999 | Todd et al. ................. | 717/172 |
| 5,941,979 A | * | 8/1999 | Lentz et al. ................. | 712/33 |
| 6,173,382 B1 | * | 1/2001 | Dell et al. ................... | 711/170 |
| 6,430,182 B1 | * | 8/2002 | Oyama ....................... | 370/388 |
| 6,553,439 B1 | * | 4/2003 | Greger et al. ................ | 710/62 |
| 6,628,662 B1 | * | 9/2003 | Blackmon et al. .......... | 370/447 |
| 6,694,361 B1 | * | 2/2004 | Shah et al. .................. | 709/222 |
| 6,826,457 B2 | * | 11/2004 | Henson et al. ............... | 701/1 |
| 6,954,810 B2 | * | 10/2005 | Delaney ...................... | 710/107 |

OTHER PUBLICATIONS

Difinition of NVRAM from Wikipedia.*
Definition of SEEPROM from TechWeb.*

* cited by examiner

*Primary Examiner*—Khanh Dang
(74) *Attorney, Agent, or Firm*—Borden Ladner Gervais LLP

(57) ABSTRACT

In one embodiment, a system for configuring an interconnect device includes a non-volatile storage device to store configuration data associated with the interconnect device and a configuration interface to request the configuration data from the non-volatile storage device. Further, the system includes an initialization module to query the configuration interface for the configuration data and to distribute the configuration data provided by the configuration interface to multiple units within the interconnect device.

14 Claims, 12 Drawing Sheets

NVRAM SELECTION TABLE

| I2C_NVRAM_PSNT INPUT PIN | CPUT_PSNT INPUT PIN | PB_CTL REGISTER BIT 7 PB_HAS_NVRAM | ACCESS NVRAM VIA CPU BUS OR I2CBUS |
|---|---|---|---|
| 0 | 0 | X | NEITHER |
| 0 | 1 | 0 | NEITHER |
| 0 | 1 | 1 | CPU INTERFACE BUS |
| 1 | 0 | X | I²C BUS |
| 1 | 1 | 0 | I²C BUS |
| 1 | 1 | 1 | BOTH CPU INTERFACE BUS AND I²C BUS |

FIG. 6

METHOD AND SYSTEM FOR CONFIGURING AN INTERCONNECT DEVICE

CROSS-REFERENCE TO RELATED APPLICATIONS

This application is a divisional of application Ser. No. 09/948,924, filed Sep. 7, 2001, which issued as U.S. Pat. No. 7,043,569 on May 9, 2006.

FIELD OF THE INVENTION

The present invention relates generally to the field of data communications and, more specifically, to configuring an interconnect device in a communications network.

BACKGROUND OF THE INVENTION

Existing networking and interconnect technologies have failed to keep pace with the development of computer systems, resulting in increased burdens being imposed upon data servers, application processing and enterprise computing. This problem has been exasperated by the popular success of the Internet. A number of computing technologies implemented to meet computing demands (e.g., clustering, fail-safe and 24×7 availability) require increased capacity to move data between processing nodes (e.g., servers), as well as within a processing node between, for example, a Central Processing Unit (CPU) and Input/Output (I/O) devices.

With a view to meeting the above described challenges, a new interconnect technology, called the InfiniBand™, has been proposed for interconnecting processing nodes and I/O nodes to form a System Area Network (SAN). This architecture has been designed to be independent of a host Operating System (OS) and processor platform. The InfiniBand™ Architecture (IBA) is centered around a point-to-point, switched fabric whereby end node devices (e.g., inexpensive I/O devices such as a single chip SCSI or Ethernet adapter, or a complex computer system) may be interconnected utilizing a cascade of switch devices. The InfiniBand™ Architecture is defined in the InfiniBand™ Architecture Specification Volume 1, Release 1.0, released Oct. 24, 2000 by the InfiniBand Trade Association. The IBA supports a range of applications ranging from back plane interconnect of a single host, to complex system area networks, as illustrated in FIG. 1 (prior art). In a single host environment, each IBA switched fabric may serve as a private I/O interconnect for the host providing connectivity between a CPU and a number of I/O modules. When deployed to support a complex system area network, multiple IBA switch fabrics may be utilized to interconnect numerous hosts and various I/O units.

Within a switch fabric supporting a System Area Network (SAN), such as that shown in FIG. 1, there may be a number of devices having multiple input and output ports through which data (e.g., packets) is directed from a source to a destination. Such devices include, for example, switches, routers, repeaters and adapters (exemplary interconnect devices). A set of switches, routers, repeaters and adapters interconnected by links is referred to as a subnet. Each subnet is managed by at least one Subnet Manager. A Subnet Manager (SM) residing either on an endnode or on an interconnect device and can be implemented either in hardware or software. A conventional subnet is not functional until it is configured by a SM. Specifically, a SM operates during the initialization process to discover the physical topology of the subnet, assign local identifiers to the endnodes and the interconnect devices, and establish possible paths among the endnodes. Based on these operations, the SM compiles various configuration information and loads this information into the subnet's interconnect devices, making them ready to handle network traffic.

One disadvantage of this approach is the necessity to load configuration information into an interconnect device each time a reset of the interconnect device occurs. This slows down the initialization process and requires additional bandwidth and processor resources to run the SM.

In addition, a problem with this approach arises when the SM resides on a server (or some other node) and data for booting the server resides on a storage device located across a network from this server. Because the IBA switch fabric is not functional until it is configured by the SM, the boot data cannot be transferred from the storage device to the server unless a network driver is available locally to activate the transmission and receipt of the boot data over the network. Accordingly, the SM itself cannot be initialized without an additional network driver residing on the server.

SUMMARY OF THE INVENTION

According to one aspect of the present invention, there is provided a system for configuring an interconnect device. In one embodiment, the system includes a non-volatile storage device to store configuration data associated with the interconnect device and a configuration interface to request the configuration data from the non-volatile storage device. Further, the system includes an initialization module to query the configuration interface for the configuration data and to distribute the configuration data provided by the configuration interface to multiple units within the interconnect device.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 6 illustrates an exemplary table for determining how to access configuration data associated with an interconnect device, according to one embodiment of the present invention;

DETAILED DESCRIPTION

Methods and systems for configuring an interconnect device are described. In the following description, for purposes of explanation, numerous specific details are set forth in order to provide a thorough understanding of the present invention. It will be evident, however, to one skilled in the art that the present invention may be practiced without these specific details.

For the purposes of the present invention, the term "interconnect device" shall be taken to include switches, routers, repeaters, adapters, or any other device that provides interconnect functionality between nodes. Such interconnect functionality may be, for example, module-to-module or chassis-to-chassis interconnect functionality. While an exemplary embodiment of the present invention is described below as being implemented within a switch deployed within an InfiniBand architectured system, the teachings of the present invention may be applied to any interconnect device within any interconnect architecture.

Figure 1:
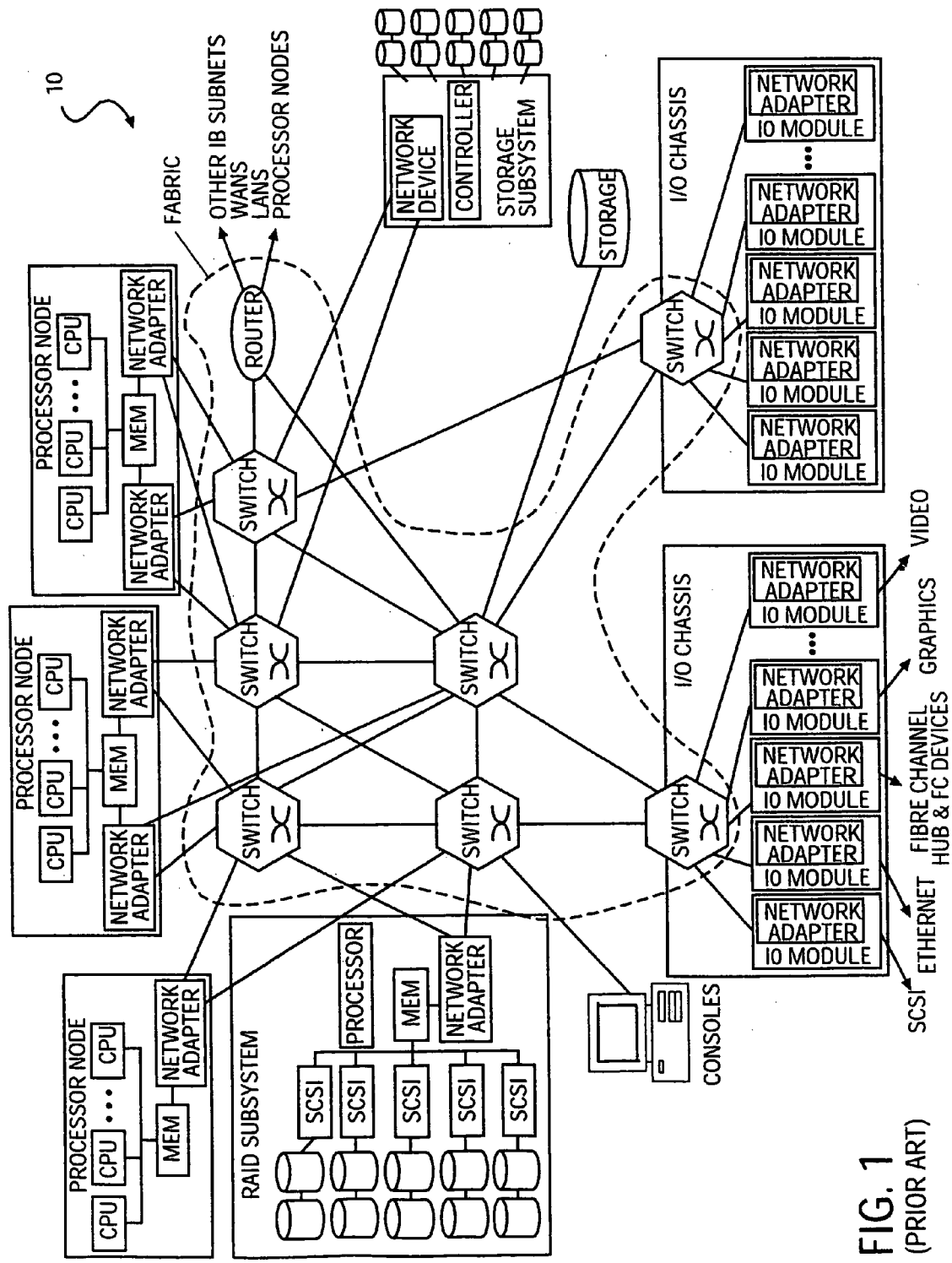
FIG. 1 is a diagrammatic representation of a System Area Network, according to the prior art, as supported by a switch fabric.
Figure 2:
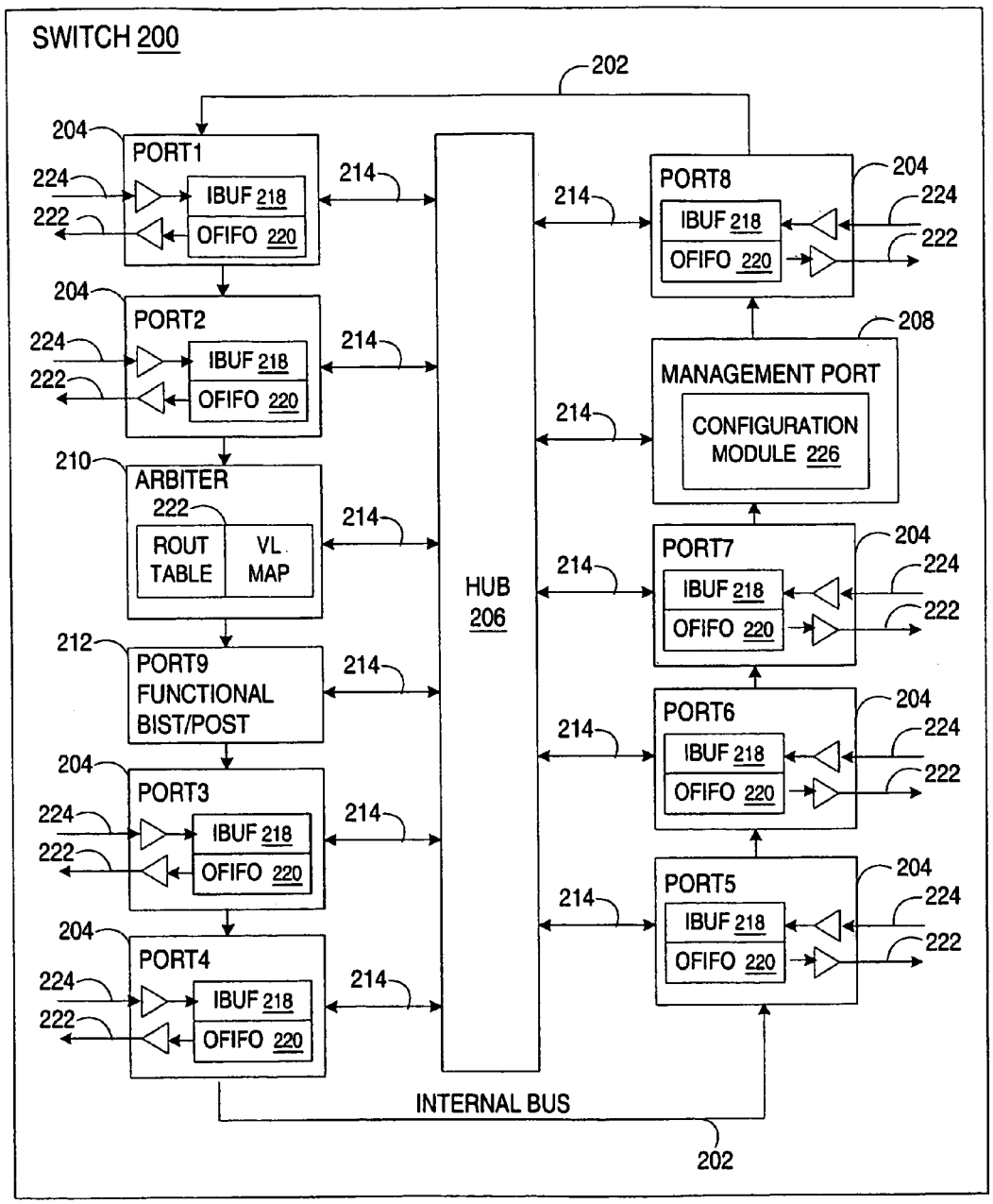
FIG. 2 is a block diagram of an exemplary interconnect device (e.g., a switch)

FIG. 2 is a block diagram of an exemplary interconnect device such as a switch 200. Switch 200 includes eight communications ports 204. Each communications port 204 receives incoming data packets via link 224 and transmits outgoing data packets via link 222. Incoming data packets are stored in input buffers 218. The capacity of each input buffer 218 is divided equally among data virtual lanes (VLs). Virtual lanes are, in one embodiment, independent data streams that are supported by a common physical link. Further details regarding the concept of "virtual lanes" is provided in the InfiniBand™ Architecture Specification, Volume 1, Oct. 24, 2000. Outgoing data packets are stored in output buffers 220. Each communications port 204 will not function properly until it is loaded with configuration data such as, for example, parameters pertaining to port links, virtual lane parameters, etc.

As data packets are received at communications ports 204, they compete for input and output resources of switch 200. Arbiter 210 arbitrates between competing requests for switch resources. These requests are transferred via communications means 214 connected by hub 206. In one embodiment, each communications means 214 includes ten 36-bit data buses, a 66-bit request bus and a 64-bit grant bus. Communications ports 204 issue resource requests to arbiter 210 via the request bus and receive resource grants from arbiter 210 via the grant bus. Arbiter 210 includes a set of tables 222 such as a Linear Forwarding Table to translate a destination address in a data packet to an output port number, a Multicast Forwarding Table to translate a destination address to multiple port numbers, a service level (SL) to VL Mapping Table to map between virtual lanes of communications ports 204, etc. Arbiter 210 is not functional unless these tables and other configuration information are loaded during the initialization process.

In addition to the eight communication ports, a management port 208 and a functional Built-In-Self-Test (BIST) port 212 are also coupled to hub 206. Functional BIST port 212 supports stand-alone, at-speed testing of switch 200. Functional BIST port 212 includes a random packet generator, a directed packet buffer and a return packet checker. As part of the initialization process, functional BIST port 212 will be loaded with Power-On-Self Test (POST) test controls. After the POST completes, the test results are checked to verify whether the POST has passed or failed. The fail or pass result is posted by an LED and stored in an internal status register.

Management port 208 includes a Subnet Management Agent (SMA) that is responsible for processing subnet management packets (SMP) sent by a Subnet Manager (SM), a Performance Management Agent (PMA) that maintains error and performance counters and a Baseboard Management Agent (BMA) that monitors environmental controls and status. Similarly to other components of switch 200, management port 208 is not functional until it is loaded with configuration data. This configuration data may include, for example, security information such as a management key, a global unique identifier (GUID) of the switch, a GUID of the port, a local identifier (LID) of the switch, etc.

In one embodiment, management port 208 also includes a configuration module 226. In another embodiment, configuration module 226 resides on a different component of switch 200 (e.g., on one of eight communications port 204, arbiter 210, or functional port 212). In yet another embodiment, configuration module 226 is an independent component of switch 200. Configuration module 226 is responsible for providing configuration data to various components of switch 200 during the initialization process, as will be described in greater detail below in conjunction with FIGS. 3A-3B.

In addition to communications means 214 and hub 206 that provide exchange of data between ports 204, 208 and 212 and arbiter 210, switch 200 includes an internal bus 202 which enables internal communication between the components of switch 200. In one embodiment, internal bus 202 is a proprietary bus of RedSwitch™ that is referred to as Internal Access Loop (IAL). Alternatively, any other point-to-point communications means known in the art can be used to provide internal exchange of data within switch 200. In one embodiment, data packets are sent via internal bus 202 using a predefined layout as will be described in greater detail below.

The present invention relates to various aspects of configuring interconnect devices (e.g., a switch, a router, an adapter, etc.) within a System Area Network. As described above, a conventional configuration process is performed by a Subnet Manager (SM) which loads configuration information into an interconnect device to activate the interconnect device in a SAN. When a reset of the interconnect device occurs, the configuration information is lost, and the SM needs to reload the configuration information to make the interconnect device functional again. As a result, the completion of the initialization process is delayed and requires additional bandwidth and processor resources to run the SM. Further, boot data for initializing a SM may reside across a network from the SM. For example, the SM may reside on a server and its boot data may be stored on a storage device located across the network from the server. Because the network is not functional until all of its interconnect devices are configured by the SM, the SM itself cannot be initialized unless a network driver is available on the server to activate the transfer of the boot data from the storage device to the server. The present invention addresses the above problems of current configuration techniques by providing a static mechanism for configuring a SAN that does not use a SM or any additional network drivers.

Figure 3A:
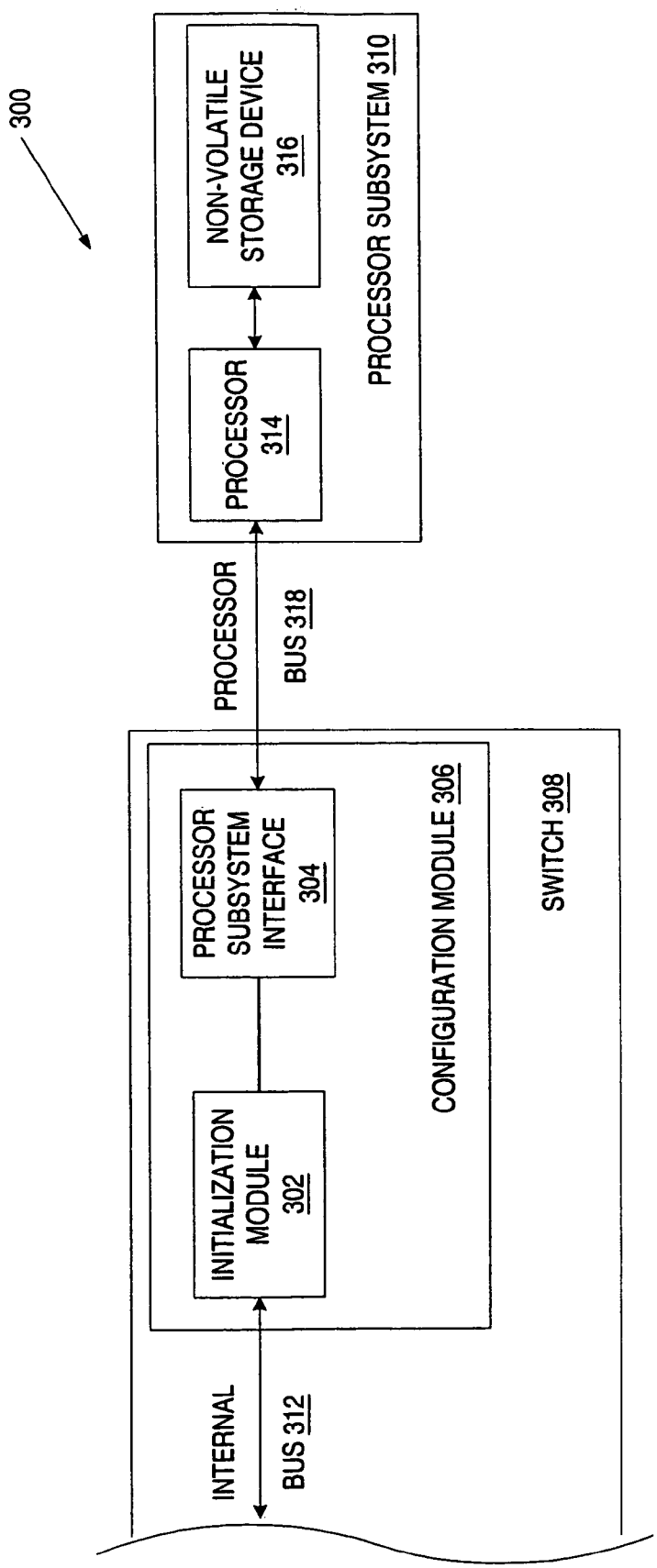
FIGS. 3A-3C are block diagrams of a system for configuring an interconnect device, according to various embodiments of the present invention.
Figure 3B:
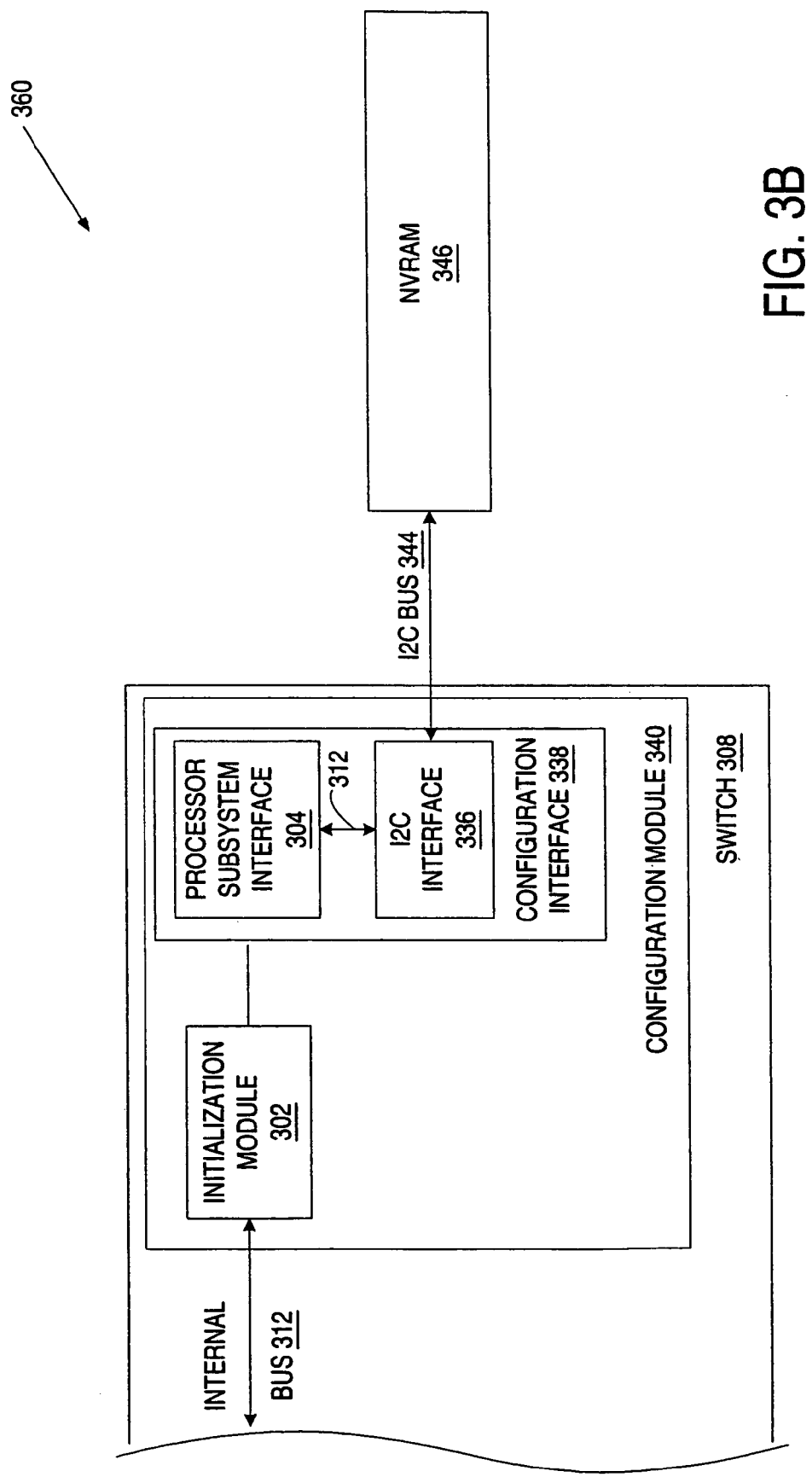
Figure 3C:
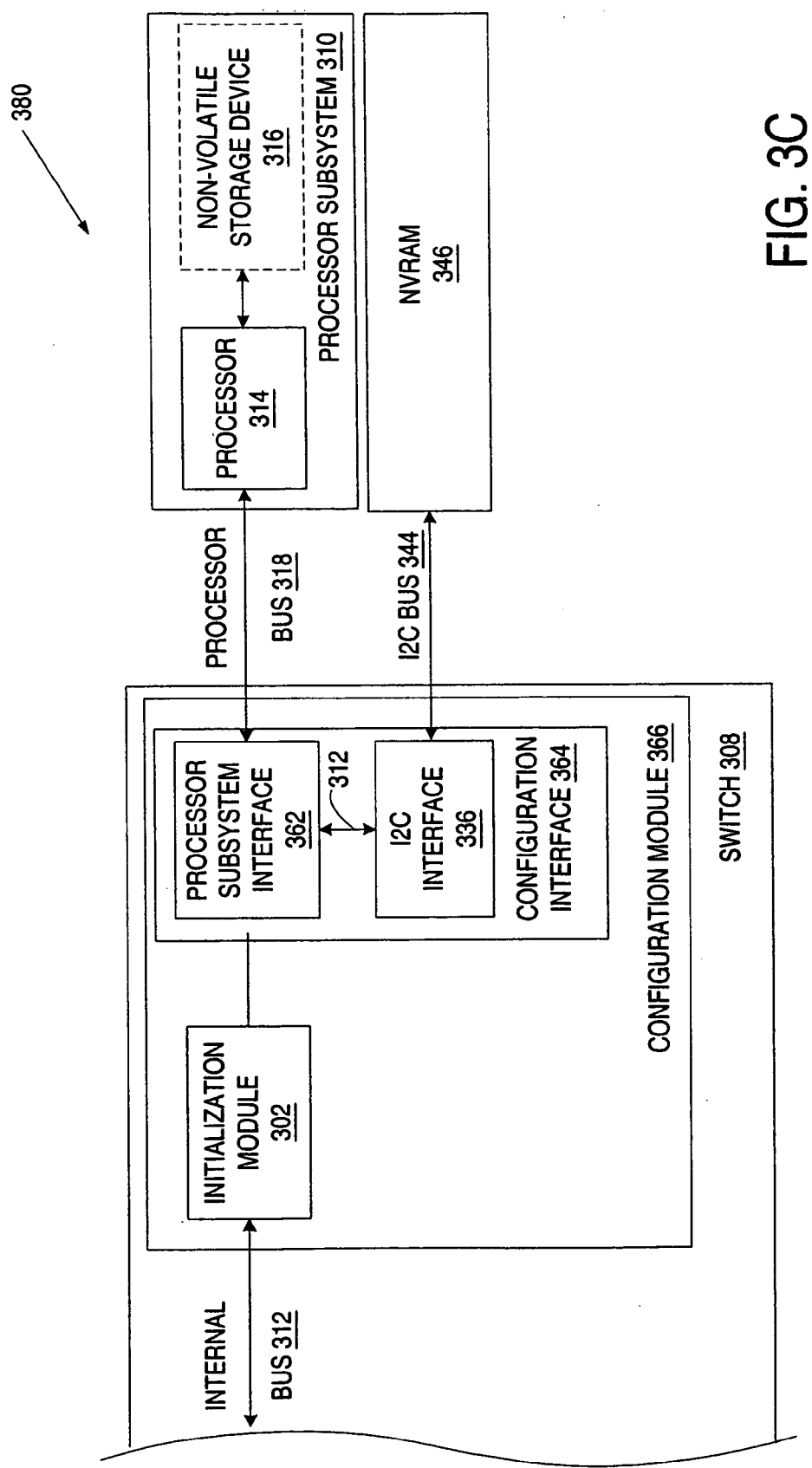

FIGS. 3A-3C illustrate various embodiments of a system for configuring an interconnect device such as a switch 308. In each of these embodiments, switch 308 is coupled to one or two non-volatile storage devices that store configuration information associated with switch 308. During the initialization process, this configuration information is retrieved from a corresponding non-volatile storage device and distributed to various components of switch 308, making it ready to handle network traffic.

Referring to FIG. 3A, switch 308 is coupled to a processor subsystem 310 which includes a processor 314 and a non-volatile storage device 316. Non-volatile storage device 316 may be a flash memory, a non-volatile random access memory (NVRAM), a hard drive, etc. Non-volatile storage device 316 is used to store various configuration information associated with the components of switch 308. In one embodiment, access to data stored on non-volatile storage device 316 is controlled by a software driver running on processor 314.

Switch 308 includes a configuration module 306 which communicates with processor subsystem 310 via a processor bus 318. Configuration module 306 may be implemented in hardware, software, or a combination of both. In one embodiment, configuration module 306 consists of an initialization module 302 and a processor subsystem interface 304. Initialization module 302 queries processor subsystem interface 304 for configuration data. Processor subsystem interface 304 requests the configuration data from processor subsystem 310 and communicates the configuration data received from processor subsystem 304 to initialization module 302. Initialization module 302 analyzes the configuration data and distributes it to various units of switch 308 via an internal bus 312. As described above, the units of switch 308 may include a set of communications ports, an arbiter, a functional BIST port, a management port, etc. In one embodiment, each block of configuration data received by initialization module 302 includes an identifier and/or address of the unit that should receive this block of configuration data. In one embodiment, the configuration data is stored in non-volatile storage device 316 in blocks, with each block including identifying information of a switch unit associated with this block of data. In one embodiment, the layout of configuration data stored in non-volatile storage device 316 may be the same as the layout expected by processor subsystem interface 304 and initialization module 302. In another embodiment, the layout of configuration data stored in non-volatile storage device 316 may differ from the layout expected by processor subsystem interface 304 and initialization module 302 (e.g., the configuration data may be stored separately from the corresponding unit identifying information). In this embodiment, the software driver running on processor 314 reorganizes the configuration data before sending it to processor subsystem interface 304 to provide a layout expected by processor subsystem interface 304 and initialization module 302.

In one embodiment, initialization module 302 takes control when reset is asserted. In one embodiment, initialization module 302 is also responsible for monitoring execution of automatic self tests (e.g., built-in self tests (BISTs)). When information received by initialization module 302 from processor subsystem 310 includes a block of data associated with an automatic self test, initialization module 302 ensures that the test conditions are enforced and monitors the result of the test. When this activity is over, initialization module 302 resumes querying processor subsystem interface 304 for configuration data until receiving an indicator associated with the end of the configuration data. Then, initialization module 302 enables the communications ports, and switch 308 becomes ready to handle network traffic.

In one embodiment, initialization module 302 is also responsible for managing updates to configuration data when such data needs to be changed. An update can be requested by a SM by issuing a SM packet. Initialization module 302 receives an update SM packet and requests processor subsystem interface 304 to update the configuration data. Processor subsystem interface 304 then requests processor subsystem 310 to update the configuration data in non-volatile storage device 316.

Referring to FIG. 3B, another embodiment of a system for configuring an interconnect device is illustrated. In this embodiment, switch 308 is not supported by a processor subsystem. Instead, switch 308 is coupled to memory 346 via a bus 344. Memory 346 stores configuration data associated with switch 308 and may be any independent non-volatile storage device such as NVRAM, flash memory, etc. Bus 344 may be an Inter-IC (I2C) bus or any other communications means known in the art that is capable of providing data exchange between switch 308 and memory 346. In one embodiment, the configuration data is stored in memory 346 in blocks, with each block having a layout expected by a configuration module 340.

In one embodiment, configuration module 340 includes an initialization module 302 and a configuration interface 338. Initialization module 302 queries configuration interface 338 for configuration data stored in memory 346. Initialization module 302 is described in greater detail above in conjunction with FIG. 3A. Configuration interface 338 requests the configuration data from memory 346 and then provides the configuration data obtained from memory 346 to initialization module 302 for distribution to the units of switch 308. In one embodiment, configuration interface 338 consists of a processor subsystem interface 304 and an I2C interface 336. Processor subsystem interface 304 sends requests for configuration data to I2C interface 336 which issues memory-read commands to memory 346. When I2C interface 336 receives the requested configuration data from memory 346, it sends this configuration data to processor subsystem interface 304 which, in turn, provides the requested configuration data to initialization module 302. In one embodiment, when an update of configuration data stored in memory 346 is requested by initialization module 302, processor subsystem interface 304 cooperates with I2C interface to transfer the update data to memory 346.

Referring to FIG. 3C, yet another embodiment of a system for configuring an interconnect device is illustrated. In this embodiment, system 380 is a combination of system 300 of FIG. 3A and system 360 of FIG. 3B. Specifically, switch 308 is coupled to a processor subsystem 310 and a memory 346. In one embodiment, the processor subsystem 310 includes a non-volatile storage device 316. Alternatively, the processor subsystem 310 does not include a non-volatile storage device 316 and configuration information associated with the units of switch 308 is stored entirely in memory 346.

In one embodiment, configuration information associated with the units of switch 308 is divided between the storage device 316 of processor subsystem 310 and independent storage device (e.g., NVRAM) 346. For example, configuration information associated with communications ports of switch 308 may reside on storage device 316 and configuration information associated with the other units (e.g., an arbiter, a functional BIST port, a management port, etc.) of switch 308 may reside on NVRAM 346. Alternatively, one of storage devices 316 and 346 may store all configuration information associated with the units of switch 308, and the other one of these storage devices may store security-related information that needs to be transferred to the units of switch 308 during the initialization process.

Configuration interface 364 identifies a storage device storing the configuration data and sends a request for the configuration data to this storage device. In one embodiment, configuration interface 364 includes a processor subsystem interface 362 and an I2C interface 336. Processor subsystem interface 362 identifies a storage device storing the configuration data. If the configuration data resides on non-volatile storage device 316, processor subsystem interface 362 sends a request for this configuration data to processor subsystem 310 via processor bus 318. In one embodiment, there is a software driver running on processor 314 that controls access to storage device 316. If the configuration data resides on NVRAM 346, processor subsystem interface 362 sends a request to I2C interface 336 which then provides access to NVRAM 346 via I2C bus 344, receives the requested data from NVRAM 346 and sends this data to processor subsystem interface 362 for subsequent transfer to initialization module 302.

Similarly, in one embodiment, when a request to update configuration data is sent to processor subsystem interface 362 by initialization module 302, processor subsystem interface 362 identifies a storage device storing the configuration data that needs to be updated and sends an update request to this storage device, either via processor bus 318 or I2C interface and I2C bus 344.

Figure 4:
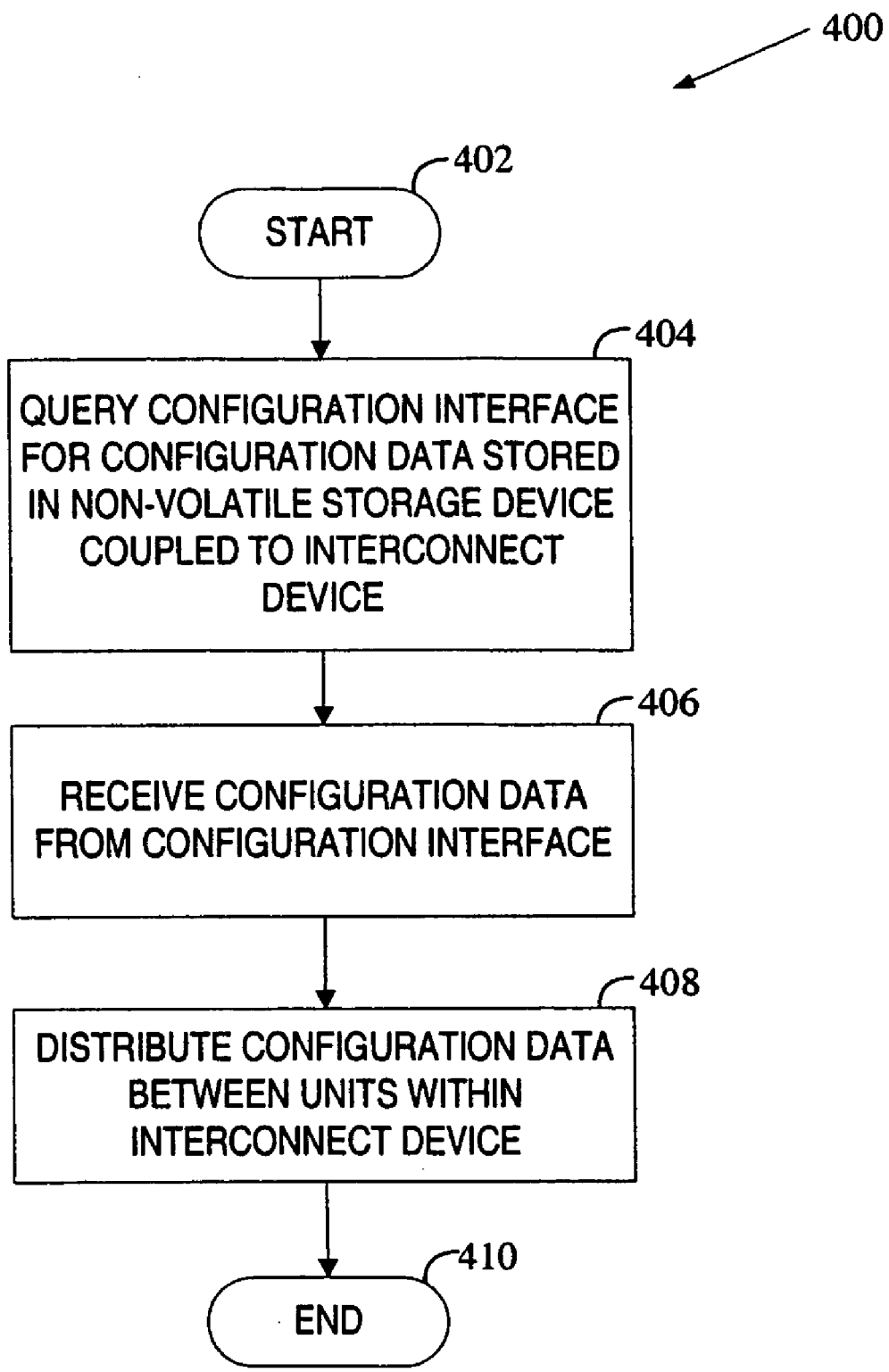
FIG. 4 is a flow diagram of a method for configuring an interconnect device, according to one embodiment of the present invention.

FIG. 4 is a flow diagram of a method 400 for configuring an interconnect device, according to one embodiment of the present invention. Method 400 is performed by processing logic, which may comprise hardware, software, or a combination of both. The processing logic may be in an initialization module or any other unit that is part of, or coupled to, the interconnect device.

Method 400 begins with querying a configuration interface for configuration data associated with an interconnect device such as a switch (processing block 404). In one embodiment, this querying is triggered by a reset of the interconnect device. In one embodiment, the querying stops during the execution of an automatic self test performed by the units of the interconnect device and resumes after the self test is completed. In one embodiment, the querying continues until receiving an indicator associated with the end of the configuration data.

The configuration data is stored in a non-volatile storage device coupled to the interconnect device. In one embodiment, a non-volatile storage device is implemented in any non-volatile manner (e.g., as an NVRAM, flash memory, a hard drive, etc.) inside a processor subsystem coupled to the interconnect device. In another embodiment, a non-volatile storage device is an independent storage device (e.g., an NVRAM implemented by a serial electrically erasable programmable read only memory (SEEPROM)) coupled to the interconnect device. In yet another embodiment, a non-volatile storage device is a combination of a storage device implemented inside the processor subsystem and an independent storage device.

At processing block 406, the configuration data is received from the configuration interface. In one embodiment, the configuration data is received by accessing a set of designated registers in the configuration interface as will be described in greater detail below. Alternatively, the configuration data may be transferred by the configuration interface using any internal communications means known in the art.

In one embodiment, the configuration data is obtained by the configuration interface by sending a request for configuration data to the non-volatile storage device and receiving the requested configuration data from the non-volatile storage device in response. In one embodiment, each block of configuration data received from the non-volatile storage device includes information identifying a unit within the interconnect device that should receive this block of configuration data.

At processing block 408, the configuration data is distributed to multiple units within the interconnect device. In one embodiment, when a block of configuration data is received, it is distributed to a corresponding unit of the interconnect device using identifying information contained in this block of configuration data. Alternatively, blocks of configuration data are accumulated until all configuration data is retrieved from the non-volatile storage device, and then the accumulated blocks of configuration data are distributed to the units of the interconnect device using the identifying information.

In one embodiment, an update of configuration data stored in the non-volatile storage device is performed upon receiving an update packet from a SM. In one embodiment, a Subnet Manager Agent (SMA) receives an update packet from the SM and writes update data to a corresponding register in an initialization module which then writes this data to a designated register in the configuration interface. The configuration interface, in turn, transfers the update data to the non-volatile storage device.

Figure 5:
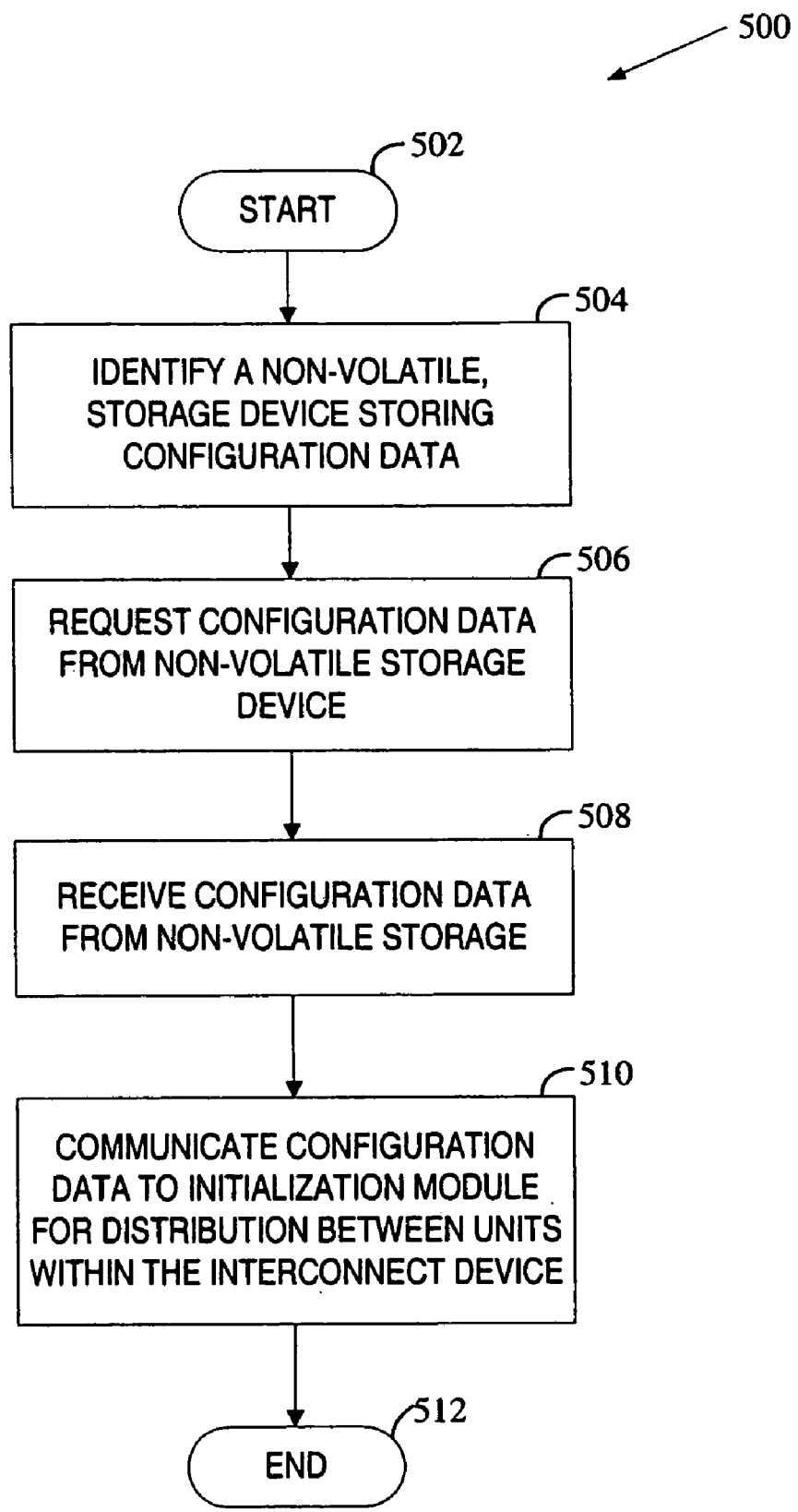
FIG. 5 is a flow diagram of a method for providing configuration information to an initialization module, according to one embodiment of the present invention.

FIG. 5 is a flow diagram of a method 500 for providing configuration information to an initialization module, according to one embodiment of the present invention. Method 500 is performed by processing logic, which may comprise hardware, software, or a combination of both. The processing logic may be in a configuration interface or any other unit that is part of, or coupled to, an interconnect device.

Method 500 begins with identifying a non-volatile storage device storing configuration data associated with the interconnect device (processing block 504). In one embodiment, values of one or more input pins of the interconnect device are used to identify such storage device. FIG. 6 illustrates an exemplary table 600 used to determine how to access a storage device storing configuration data associated with the interconnect device, according to one embodiment of the present invention.

Referring to FIG. 6, column 602 stores values of the interconnect device's input pin which is designated to indicate whether the interconnect device is coupled to an independent NVRAM via an I2C bus. Column 604 stores values of the interconnect device's input pin which is designated to indicate whether the interconnect device is coupled to a processor subsystem (including an NVRAM) via a processor bus. Column 608 stores values of a control register bit at the processor bus. Column 608 indicates whether the NVRAM storing required information should be accessed via the I2C bus or the processor bus.

The last row in the table includes a combination of values that allows the access via both the I2C bus and the processor bus. This combination may occur when the interconnect device is coupled to both NVRAMs (i.e., the NVRAM inside the processor subsystem and the independent NVRAM coupled to the interconnect device via the I2C bus). Then, the configuration data may be divided between the two NVRAMs as described above. Alternatively, the NVRAM inside the processor subsystem may contain data related to security of the interconnect device and the independent NVRAM may store the configuration data.

Returning to FIG. 5, at processing block 506, a request for configuration data is sent to the non-volatile storage device identified at processing block 504. In one embodiment, this request is a memory-read command. Alternatively, the request may be in any other form understandable by the non-volatile storage device or software driver controlling access to the non-volatile storage device.

At processing block 508, the configuration data is received from the non-volatile storage device. At processing block 510, this configuration data is provided to the initialization module for distribution to the units within the interconnect device. In one embodiment, the configuration data is communicated by writing it to a set of designated registers accessible by the initialization module.

In one embodiment, a request to update the configuration data is received from the initialization module. The request may be caused by the initialization module writing the update data to a designated register of the configuration interface. A determination is then made as to whether the configuration data that needs to be updated is stored in the NVRAM inside the processor subsystem or in the independent NVRAM. If the data is stored in the NVRAM inside the processor subsystem, then the update request is sent via the processor bus. Alternatively, the update request is sent via the I2C bus (e.g., in the form of memory-write command).

In one embodiment, the independent non-volatile storage device can store data of a limited size. For example, the I2C NVRAM may be no more than 64 K bytes. Alternatively, the NVRAM can be as big as the capacity allotted by the processor subsystem design. In one embodiment, the NVRAM includes a configuration section and a section containing data related to security of the interconnect device (e.g., a global user identifier associated with the switch, information identifying a vendor of the switch, a management key, a partition key, etc. Alternatively, the NVRAM may only contain the configuration data or a part of the configuration data. It should be noted that various other arrangements for storing the configuration data in the NVRAM can be used without limiting the scope of the present invention.

Figure 7:
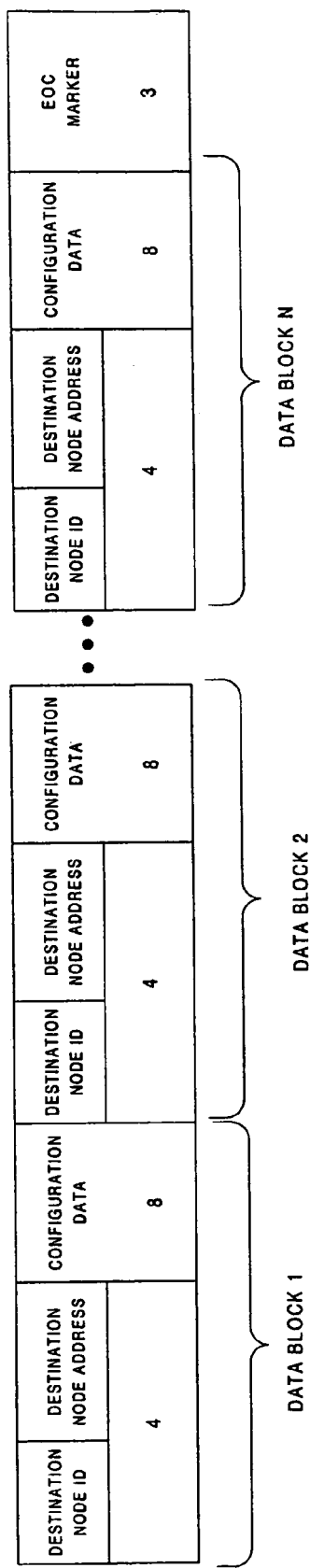
FIG. 7 illustrates an exemplary data layout of configuration data stored on a non-volatile storage device.

FIG. 7 illustrates an exemplary data layout of configuration data stored on a non-volatile storage device. Referring to FIG. 7, the configuration data is stored in blocks, followed by a marker indicating the end of configuration data. In one embodiment, the data format of each block follows the data format of internal communications packets (e.g., IAL packets).

Each block of configuration data consists of 12 bytes: 4 bytes are designated for a destination node identifier (ID) and a destination node address, and 8 bytes are designated to store payload data (e.g., IAL packet payload data). The payload data may include configuration data such as arbiter tables data, management port data, communications port data, etc. The payload data is associated with a switch unit identified by a destination node ID and address that precede this payload data. In one embodiment, some blocks of configuration data may include a destination address of the BIST start register indicating the beginning of the self test. In yet another embodiment, some blocks of configuration data may include semaphore information, with the node ID and address identifying the semaphore and the payload data including some predefined information. The functionality of a semaphore will be described in greater detail below in conjunction with FIG. 9.

Figure 8A:
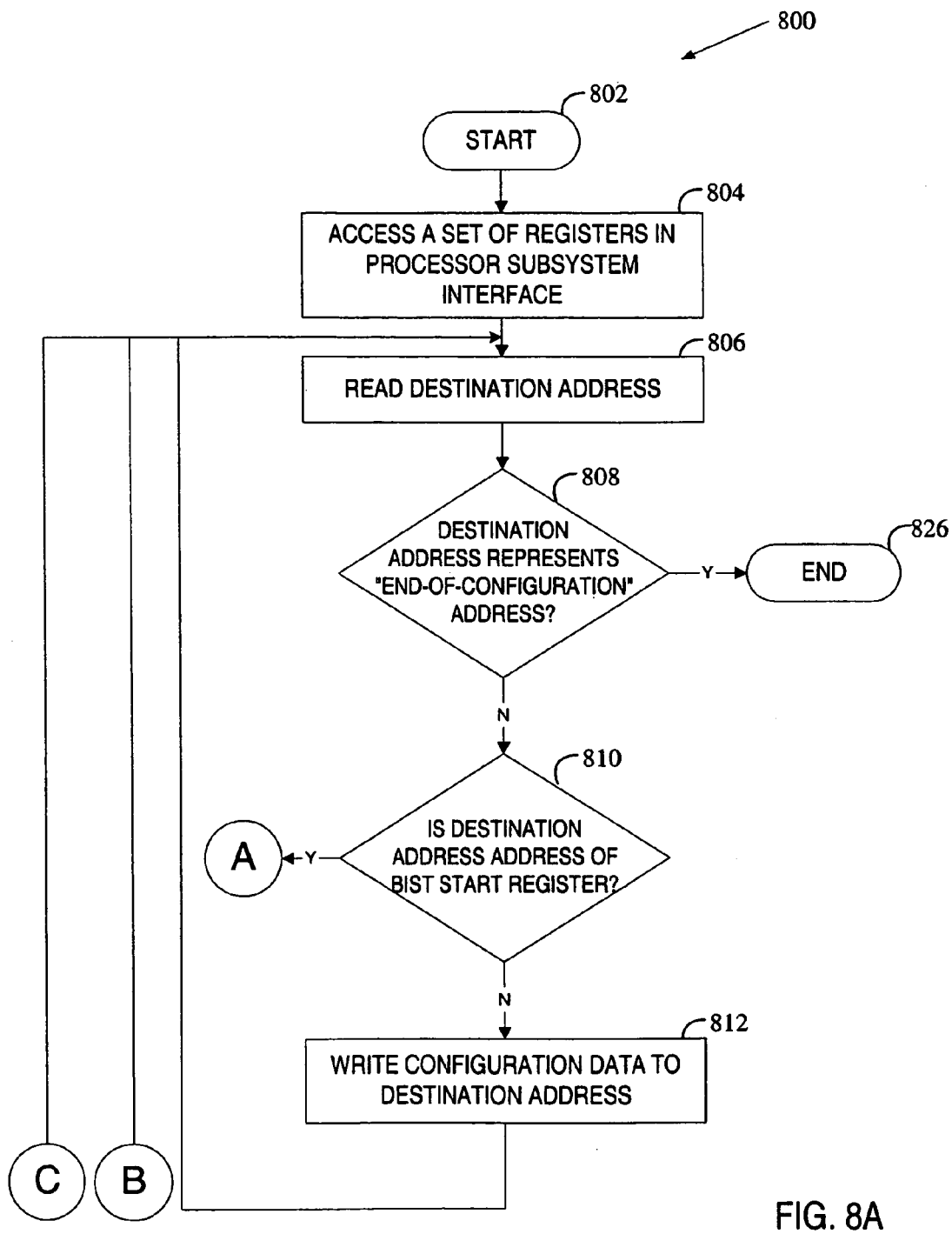
FIGS. 8A and 8B are flow diagrams of a method for processing configuration associated with an interconnect device, according to one embodiment of the present invention.
Figure 8B:
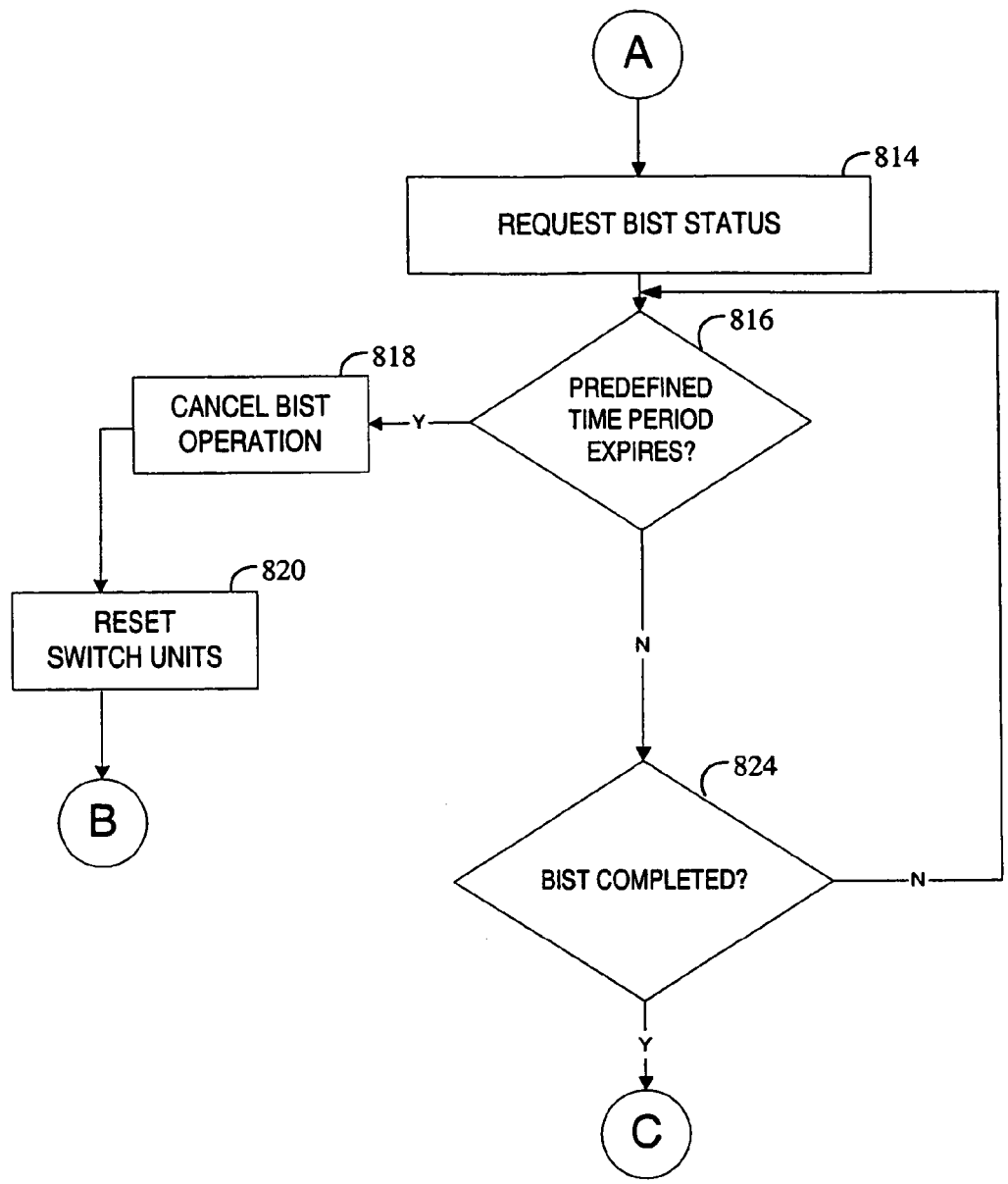

FIGS. 8A and 8B are flow diagrams of a method 800 for processing configuration data associated with an interconnect device, according to one embodiment of the present invention. Method 800 is performed by processing logic, which may comprise hardware, software, or a combination of both. The processing logic may be in an initialization module or any other unit that is part of, or coupled to, an interconnect device.

Method 800 begins with accessing a set of designated registers in a processor subsystem interface (processing block 804). In one embodiment, the registers are accessed upon receiving a signal from the processor subsystem interface indicating that the processor or an independent NVRAM is ready to handle requests for configuration data. In one embodiment, this signal means that the processor subsystem interface begins issuing memory-read commands to the processor subsystem or the NVRAM. In response to these commands, the processor subsystem interface receives blocks of configuration data and writes them to its designated registers.

At processing block 806, a destination address is read from one of the above registers. At decision box 808, a determination is made as to whether the destination address represents an end-of-configuration marker. If the determination is positive, then loading of configuration data is completed, and method 800 ends. Otherwise, a further determination is made at decision box 810 as to whether the destination address is the address of a BIST start register. If this determination is positive, then the BIST operation begins and the BIST status register is polled (processing block 814). If the BIST operation does not terminate within a predefined time period (decision box 816), then the BIST operation is cancelled (processing block 820) and the switch units (except the initialization module and the processor subsystem interface) are reset (processing block 820). Method 800 then returns to processing block 806. If the BIST operation does terminate within the predefined time period, method 800 continues with processing block 806.

If the determination made at decision box 810 is negative, payload data following the destination address is read and is then written to the address associated with one of multiple units within the switch (processing block 812). Method 800 then returns to processing block 806 and continues until the "end-of-configuration" marker is reached.

In one embodiment, when configuration data is stored in an independent storage device (e.g., an I2C NVRAM) and the interconnect device is also supported by a processor via a processor subsystem interface, the processor or processor software may need to be aware of a current status of the initialization process to be able to properly schedule its tasks. The present invention provides a mechanism for informing the processor subsystem about the progress of the initialization process using a semaphore. A semaphore is defined as a packet (e.g., IAL packet) with a predefined destination node ID and a predefined node address. The payload of this packet may be used to communicate certain information to the processor subsystem. For example, the payload may include data indicating that loading of a particular portion of the configuration data has been completed. In one embodiment, semaphores are loaded when the interconnect device is manufactured. Alternatively, the semaphores may be inserted into the configuration data after the interconnect device was manufactured. For example, the semaphores may be inserted during the update of configuration data that is described in more detail above. A software driver running on the processor may then be programmed to recognize these semaphores.

Figure 9:
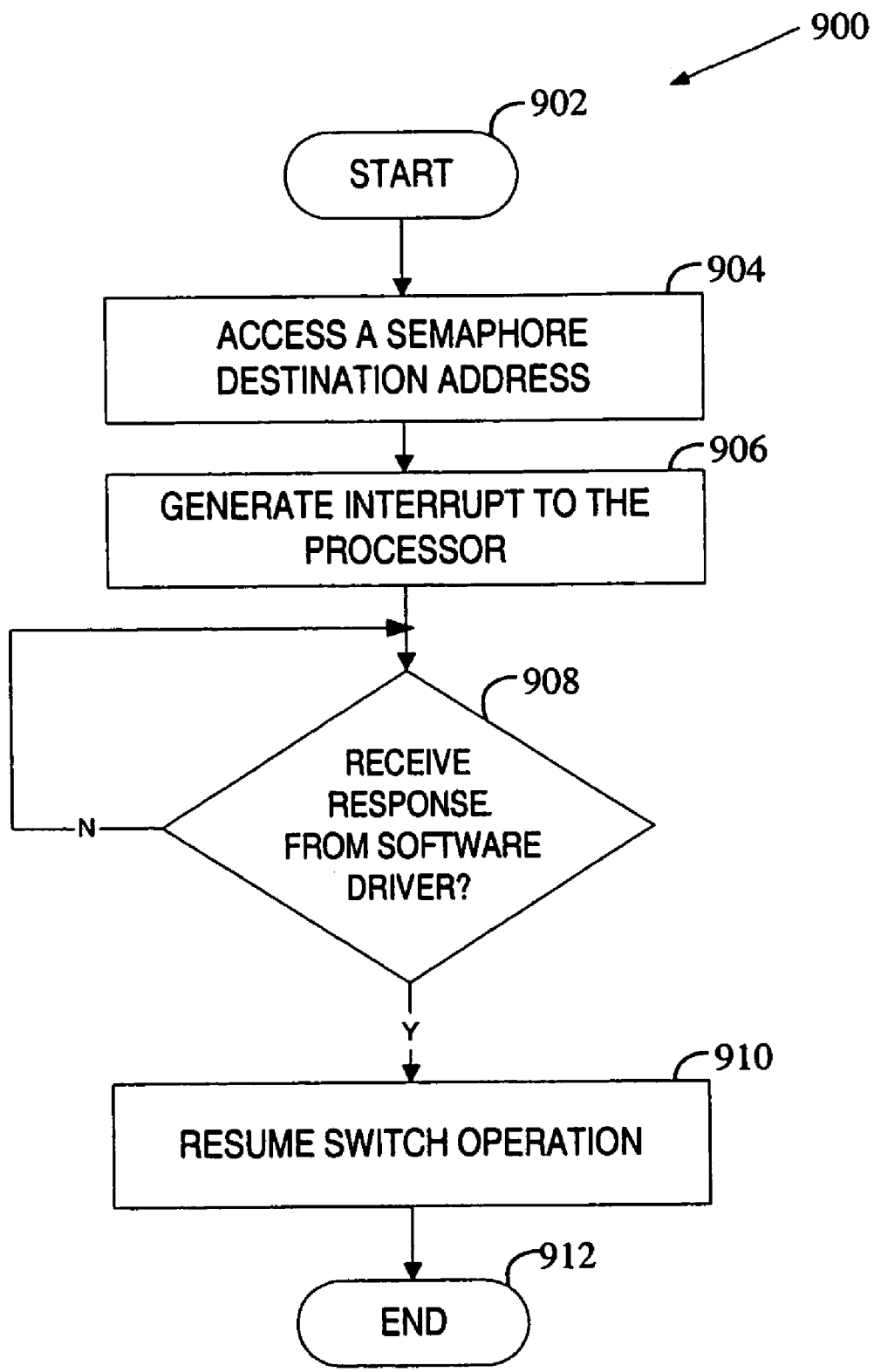
FIG. 9 is a flow diagram of a method for informing a processor subsystem about the progress of the initialization process pertaining to an interconnect device, according to one embodiment of the present invention.

FIG. 9 is a flow diagram of a method 900 for informing a processor subsystem about the progress of the initialization process, according to one embodiment of the present invention. Method 900 begins with accessing a data packet with a destination address associated with a semaphore (processing block 904). Because this destination address is unknown to the processor subsystem interface, it is forwarded to the processor by generating an interrupt to the processor with the data packet pending (processing block 906). The processor software is aware of a destination address associated with semaphores and accesses the payload data of the pending packet to obtain information pertaining to the progress of the initialization process or any other information included in the payload.

The interconnect device does not resume its operation until the interrupt is responded by the processor software (decision box 908 and processing block 910). As a result, the progress of the initialization process pertaining to the interconnect device can be monitored by the processor.

Thus, methods and systems for configuring an interconnect device have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method for configuring an interconnect device, the method comprising:
   requesting configuration data;
   determining whether the requested configuration data resides in an independent storage device coupled to the interconnect device via an Inter-IC (I2C) bus or a storage device contained in a processor subsystem coupled to the interconnect device via a processor bus;
   sending a request for the configuration data to the I2C if the requested configuration data is determined to reside in the independent storage device, or to the processor sub-system if the requested configuration data is determined to reside in the storage device;
   receiving the configuration data from the determined one of the independent storage device or the storage device; and
   communicating the configuration data to an initialization module for distribution to a plurality of units within the interconnect device.

2. The method of claim 1 wherein the configuration data is any one of a set of parameters pertaining to port links, a set of virtual lane parameters, security-related data, data for a Linear Forwarding Table, data for a Multicast Forwarding Table, and data for a Service Level (SL) to Virtual Lane (VL) Mapping Table.

3. The method of claim 1 wherein the plurality of units within the interconnect device includes a set of communication ports, a functional Built-In-Self-Test (BIST) port, a management port, and an arbiter.

4. The method of claim 1 wherein the storage device is an independent device coupled to the interconnect device via an Inter-IC (I2C) bus.

5. The method of claim 1 wherein the storage device is part of a processor subsystem coupled to the interconnect device via a processor bus.

6. The method of claim 1 wherein the configuration data is stored in the storage device in blocks, each block containing an identifier of a corresponding destination unit within the interconnect device and configuration information to be loaded to the corresponding destination unit.

7. The method of claim 1 further comprising:
   receiving a request to update the configuration data stored in the storage device; and
   transferring update data to the storage device.

8. A system for configuring an interconnect device, the system comprising:
   a non-volatile random access memory (NVRAM) to store configuration data pertaining to the interconnect device;
   a processor subsystem including a processor; and
   a management port comprising:
   a configuration interface comprising a processor interface coupled to the processor subsystem via a processor bus, and coupled to an I2C interface to provide access to the NVRAM, the configuration interface determining whether requested configuration data resides in the NVRAM or the processor subsystem, and sending a request for the configuration data to the processor subsystem or the I2C interface in accordance with the determination; and
   an initialization module to query the configuration interface for the requested configuration data, to receive the configuration data from the configuration interface, and to distribute the configuration data to a plurality of units within the interconnect device.

9. The system of claim 8 wherein the configuration data is any one of a set of parameters pertaining to port links, a set of virtual lane parameters, security-related data, data for a Linear Forwarding Table, data for a Multicast Forwarding Table, and data for a Service Level (SL) to Virtual Lane (VL) Mapping Table.

10. The system of claim 8 wherein the plurality of units within the interconnect device includes a set of communication ports, a functional Built-In-Self-Test (BIST) port, a management port, and an arbiter.

11. The system of claim 8 wherein the NVRAM is a serial electrically erasable programmable read only memory (SEEPROM).

12. The system of claim 8 wherein the configuration data stored in the NVRAM includes semaphore data to synchronize activities controlled by the processor with the configuration process.

13. The system of claim 8 wherein the configuration data is stored in the NVRAM in blocks, each block containing an identifier of a corresponding destination unit within the interconnect device and configuration information to be loaded to the corresponding destination unit.

14. The system of claim 13 wherein the layout of the configuration data received by the initialization module is the same as the layout of the configuration data stored in the NVRAM.

* * * * *